United States Patent
Kalshoven, Jr. et al.

(10) Patent No.: US 6,744,470 B1
(45) Date of Patent: Jun. 1, 2004

(54) SYNCHRONIZATION OF VIDEO RECORDING AND LASER PULSES INCLUDING BACKGROUND LIGHT SUPPRESSION

(75) Inventors: James E. Kalshoven, Jr., Seabrook, MD (US); Michael Tierney, Jr., Fairfax, VA (US); Philip W. Dabney, Seabrook, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/662,717

(22) Filed: May 2, 1995

Related U.S. Application Data

(63) Continuation of application No. 07/909,873, filed on Jul. 7, 1992.

(51) Int. Cl.$^7$ .............................................. H04N 5/222
(52) U.S. Cl. ...................................... 348/370; 348/296
(58) Field of Search ..................... 348/207.99, 222.1, 348/294, 296, 297, 311, 312, 314, 370, 371, 375; 388/117, 118, 119

(56) References Cited

U.S. PATENT DOCUMENTS 4,635,123 A * 1/1987 Masunaga et al. .......... 348/371
4,805,037 A * 2/1989 Noble et al. ................ 386/119
4,888,644 A * 12/1989 Wilson ....................... 348/371

* cited by examiner

*Primary Examiner*—Tuan Ho
(74) *Attorney, Agent, or Firm*—Ronald F. Sendler; Keith L Dixon

(57) ABSTRACT

An apparatus for and a method of triggering a pulsed light source, in particular a laser light source, for predictable capture of the source by video equipment. A frame synchronization signal is derived from the video signal of a camera to trigger the laser and position the resulting laser light pulse in the appropriate field of the video frame and during the opening of the electronic shutter, if such shutter is included in the camera. Positioning of the laser pulse in the proper video field allows, after recording, for the viewing of the laser light image with a video monitor using the "pause" mode on a standard cassette-type VCR. This invention also allows for fine positioning of the laser pulse to fall within the electronic shutter opening. For cameras with externally controllable electronic shutters, the invention provides for background light suppression by increasing shutter speed during the frame in which the laser light image is captured. This results in the laser light appearing in one frame in which the background scene is suppressed with the laser light being uneffected, while in all other frames, the shutter speed is slower, allowing for the normal recording of the background scene. This invention also allows for arbitrary (manual or external) triggering of the laser with full video synchronization and background light suppression.

19 Claims, 2 Drawing Sheets

SYNCHRONIZATION OF VIDEO RECORDING AND LASER PULSES INCLUDING BACKGROUND LIGHT SUPPRESSION

This application is a continuation of application Ser. No. 07/909,873, filed Jul. 7, 1992.

ORIGIN OF INVENTION

The invention described herein was made by employees of the United States Government and may be manufactured and used by or for the Government for Governmental purposes without the payment of royalties thereon or therefor.

TECHNICAL FIELD

This invention relates generally to video viewing of an image both in real-time and from a recording. More particularly, it relates to the synchronization of the triggering of a pulsed light source to video viewing and recording devices and electronic shutters and to the suppression of ambient background light relative to the pulsed light in the same image frame for such devices. The invention triggers the light source at intervals dictated by the video camera signal or may, in the alternative, trigger the light source in response to an external voltage pulse.

BACKGROUND ART

There is a generally recognized need for the video viewing of various pulsed light sources, in particular pulsed laser or lidar sources, both in real-time and from a recording. The light pulse width is typically short relative to the time it takes to produce one television screen field (i.e. <1/60 second). Two fields make up a television frame, which is one complete image. The two fields are virtually identical in terms of image content and have been provided in standard television systems to reduce apparent flicker to the observer. Capture of the pulsed light at a specific time in the television frame is random. While this randomness does not interfere with direct viewing in real-time or continuous viewing of a recorded image from a standard video cassette recorder ("VCR"), continuous viewing of one image, i.e., employing the "pause" function on a video tape recorder, does not always show the light pulse. It "disappears" when the tape is paused. This is because the pulsed light can fall randomly within either of the two video fields that make up the video frame. The system employed on virtually all standard VCR's presents the entire frame for viewing under normal running conditions. However, in the "pause" mode, only one field, either the first or second depending on the particular model VCR, is consistently chosen for display of the image. This design is employed to avoid jitter when viewing a "paused" recording with the typical spinning record head used in VCR's. It is impossible to consistently establish the synchronization of the light pulse to the same video field required for the "pause" mode while at the same time continuously viewing the real-time image capture process on a monitor. The entire frame is presented during real-time and there is no indication during which field the pulse of light is emitted.

Historically, attempts were made to manually adjust the repetition rate of the pulsed light source to match that of the proper field of the video device, providing a satisfactory solution that related to the precision of establishing and maintaining the relative frame and pulse rates. The process was tedious because the image had to be recorded and then the tape rewound and viewed in the pause mode to confirm capture of the pulsed light in the proper field. The light pulse system timing and the camera system video rate could also drift over time relative to each other, disrupting the synchronization. Since at least half the light pulses, on the average, would be in the correct field, the problem was ignored, particularly because the light pulse could be seen at all times with continuous viewing. There is, however, a need for a simple system to allow for synchronization of the light pulse to the proper video field.

In addition, there has been a long standing need to provide a system that will allow predictable capture of a pulsed light source by video cameras that incorporate electronic shutters. These shutters are in most cameras and are typically used to reduce image blurring in a moving scene. At best, with the present approach, there is only random capture of pulsed light. This occurs when a pulse is of shorter duration than, and coincident with, the shutter open time. Unlike the case without a shutter, the pulsed light will only be seen occasionally in a non-synchronized system operating continuously.

Furthermore, in viewing a video recording of a weak pulse of light in a high ambient light background, some suppression of the background light is needed or desired. However, continuous suppression of the background light would normally interfere with viewing the pulsed light in the context of the background. For instance, while viewing a laser spot for spatial positioning on a bright surface, it is necessary to see the surface. The prior art does not teach how to suppress the background without also suppressing the pulsed light image. In most circumstances, it is desirable to retain background information while seeing the pulsed light source. There is a need for a simple system that would allow examination, in the same frame, of both the background and a weak pulse of light in that background.

In addition, it is not apparent that any attempt has been made historically to have manual or external voltage pulses to allow arbitrary, yet still synchronized, triggering of light pulses for video viewing, recording, and background light control. Arbitrary triggering would include "one-shot" manual triggering or external triggering sources such as pulse generators, including both traditional, repetitive pulse sources as well as irregular sources of pulses.

STATEMENT OF THE INVENTION

Accordingly, it is an object of this invention to provide an improvement in the video viewing, both in real-time and from a recording, of pulsed light sources.

It is a further object of this invention to provide an apparatus and method for synchronizing a pulsed light source to a video camera so that the pulse can predictably be seen during the pause mode of a VCR.

It is another object of this invention to provide an apparatus and method for synchronizing a pulsed light source to the opening of the electronic shutter employed in a video camera.

It is yet another object of this invention to provide an apparatus and method for the suppression of background ambient light when imaging pulsed light without effecting the intensity of the pulsed light itself, and yet allowing the background to be viewed.

It is still another object of this invention to provide for arbitrary triggering of a pulsed light source in such a manner that the light pulse is synchronized to the video signal for video recording and viewing and electronic shutter control, if available.

Briefly, the foregoing objects are obtained through interface electronics which controls the triggering or firing of each pulse of light from a triggerable pulsed light source such as strobes or, in particular, a pulsed laser. This control is obtained by deriving a synchronization pulse from a camera video signal. Further, the interface electronics may control the electronic shutter on a camera, where the shutter speed on the camera is controlled on a frame-by-frame basis. The term "shutter speed," in this instance, means the duration of time that the shutter remains open, effecting the exposure. This allows the shutter speed to be varied on each frame. This feature is employed to obtain suppression of the background ambient light in the frame where the light pulse is captured. The invention further allows said synchronization to be continuous, i.e., the light pulse being triggered at regular, arbitrary intervals, or at manual, i.e., single triggering events implementted by, e.g., a button-type switch or other arbitrary external occurring trigger sources.

DETAILED DESCRIPTION OF THE INVENTION

Figure 1:
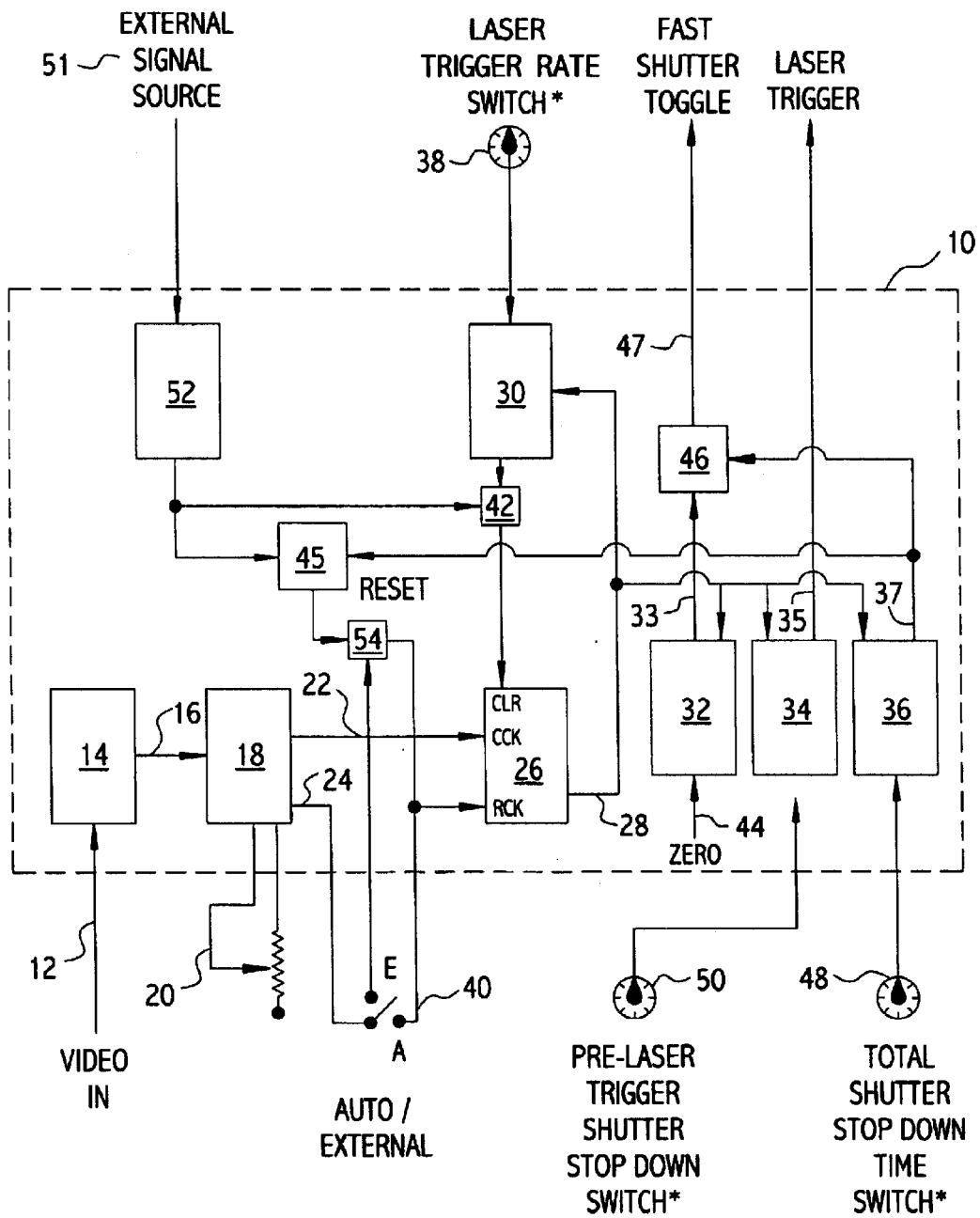
FIG. 1 is a block diagram of the interface electronics in accordance with this invention.
Figure 2:
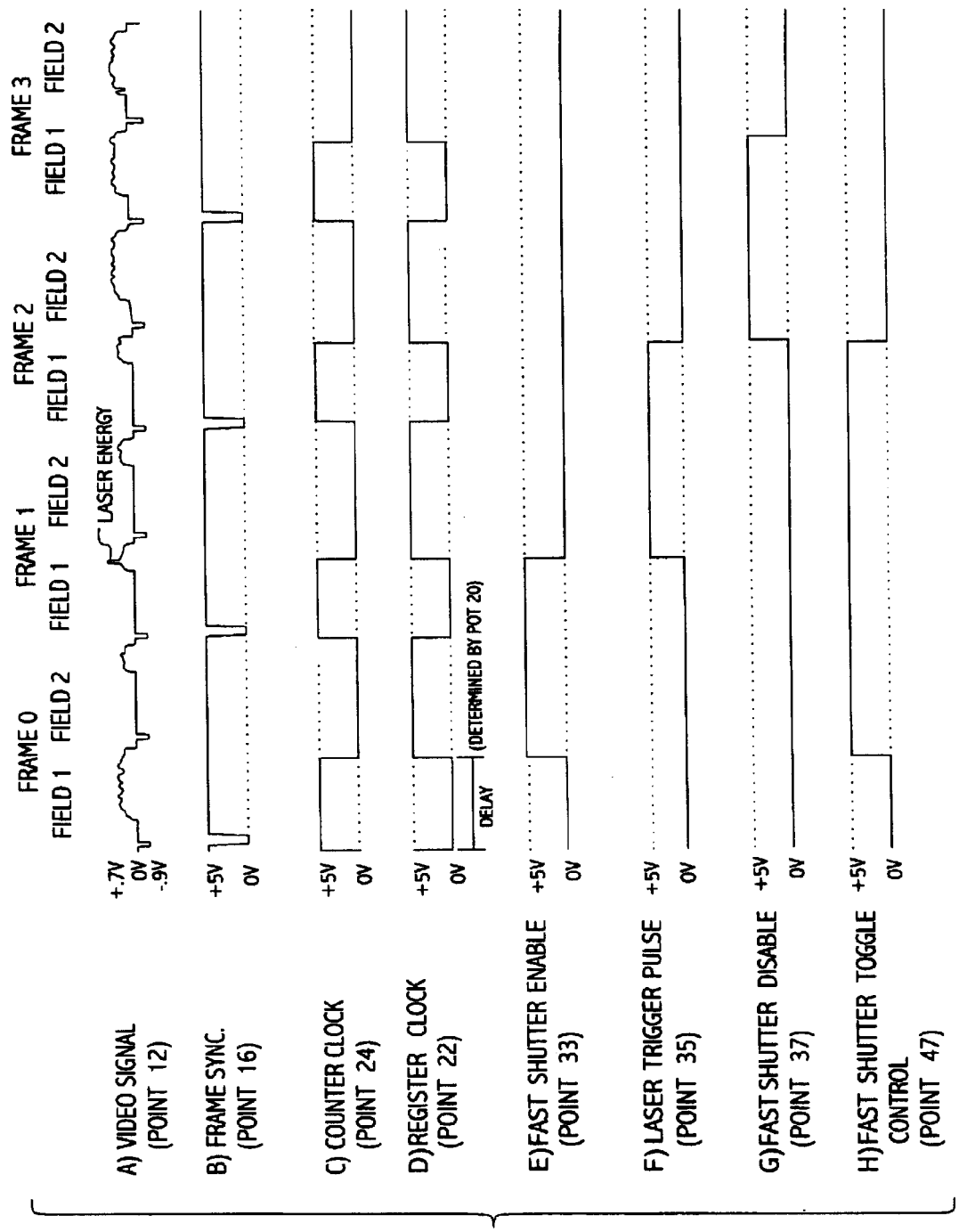
FIG. 2 is a timing diagram of various signals inputted, outputted, and appearing within the interface electronics.

Referring now to the drawings, FIG. 1 shows one embodiment of the interface electronics 10 of the present invention and FIG. 2 shows the timing diagram for signals appearing at significant points in FIG. 1. A standard TV output 12, depicted in FIG. 2a, from a video camera (not shown), is inputted into a sync stripper integrated circuit 14 to derive a frame synchronization pulse, as depicted in FIG. 2b. This circuitry is available from several manufacturers, e.g. from 3rd Domain. Inc., Tucson. Ariz. This type circuitry typically has the capability of extracting vertical, horizontal, and frame synchronization pulses from the video band baseline signal directly or after demodulation from the RF TV signal (the Ch3 or Ch 4 frequency signal output). The frame synchronization pulse is outputted at connection 16 and is inputted to a pulse generating circuit 18 consisting of a monostable multivibrator integrated circuit chip, e.g. a #74121 chip available from several manufactures such as Texas Instruments. The dual, complementary output pulses from this circuit 22, 24, as shown in FIG. 2c,d, have a length determined by varying a potentiometer 20 in parallel with a capacitor (not shown) attached to chip 18, as is the conventional practice with this chip. The frame pulse 16 is negative going. With no pulse input, 0 volts appears on 22, and 5 volts appears on 24. With a pulse input at 16, the resulting wide pulse output 22 goes positive to 5 volts and complementary wide pulse 24 goes negative to 0 volts. Pulses 22 and 24 are fed to counter 26, e.g. a #74590 integrated circuit chip available from several manufactures such as Texas Instruments. The counter CCK counts the sequential rising edges of the pulses from input 22 and outputs the count as a binary number through the on-chip register whenever the register output RCK is enabled by the rising of pulse 24. This chip design allows timing control of the chip output by turning the register on and off without interfering with the ongoing binary count. Because the pulses 22 and 24 are simultaneous, the register only provides the required delay introduced by potentiometer 20 so that chip 26 is basically acting as a delayed pulse generator in a free-running or automatic triggering mode. When employing an external signal for arbitrary triggering times, to be further discussed below, signal 24 is replaced through switch 40 by an external signal and is no longer the simultaneous complement of signal 22 and the register RCK outputs the binary counts at irregular intervals depending on the arbitrary triggering. When operating in the free-running or automatic mode, the binary count on output 28 of register RCK is fed to four comparators 30,32,34,36, e.g. #74682 integrated circuit chips available from several manufactures such as Texas Instruments. Comparator 30 also receives an input from a binary DIP switch 38 which is externally mounted and accessible by a user. A setting on the DIP switch 38 is equal to the number of frames the user desires between triggerings of the pulsed light source. Because each frame is fixed at ⅟₃₀ second, switch 38 could be calibrated in time intervals between light pulse triggering. A single-pole-single-throw (SPST) mechanical toggle switch 40 allows user selection of automatic triggering or manual triggering. Following the automatic triggering path through switch 40 at position A, the output from comparator 30 is sent through OR gate 42 to the clear CLR input to reset counter 26 to zero. The OR gate buffers the lines feeding the clear CLR input. These lines arise from the automatic and manual mode differences. Register output 28 is fed to comparator 32 which also receives a constant zero input 44. When the zero is received from the register of counter 26, the comparator output 33, illustrated by FIG. 2d, goes active. Output 33 is connected to flip-flop 46. When output 33, as illustrated by FIG. 2e, goes active, flip-flop 46 goes high, latching fast shutter signal 47 in its high state. This is the shutter control signal to the camera. When high, signal 47 enables the camera to be in the fast shutter mode and begin background light suppression. When signal 47 goes low, the camera returns to the previously set slow shutter speed. The output from flip-flop 46 will stay high until toggled by a high signal from output 37, as illustrated by FIG. 2f, from comparator 36. The register output 28 from counter 26 also feeds comparator 36. Comparator 36 compares this input to the setting input from binary DIP switch 48. This DIP switch is set by the user for the total number of frames that the electronic shutter stays at the fast mode. Comparator 34 also takes an input from the register of counter 26. It compares this value to the value set on binary DIP switch 50 and outputs a light triggering pulse voltage 35, as illustrated by FIG. 2e, when the values match. The setting on switch 50 determines the frame after fast shutter initiation in which the light is triggered. FIG. 2h illustrates the total fast shutter operating time. These shutter settings are made available to the user in this embodiment to allow for flexibility in camera selection and triggering to accounts for the time between the actual triggering time and the resulting light output. If a camera responds quickly to shutter changes and the light pulses are predictable in response to a trigger, then modification to the comparator circuits can be made to eliminate the need for the DIP switches 48, 50.

For the external signal source input 51, either an impulse is derived from a voltage source with a manually operated button-type switch or from an external pulse generator. This voltage impulse is applied to monostable multivibrator 52 integrated circuit chip, e.g., a #74121 available from several manufactures such as Texas Instruments. In order to use this external mode, switch 40, which is in the A position for automatic mode, must first be moved to the E position. This allows wide pulse 24 output from multivibrator 18 to be turned on and off by AND gate 54 before going to register RCK of counter 26. This circuit prevents any triggering of the pulsed light source until an external signal is applied. This external signal controls the output from multivibrator 52. This output, a short pulse, has a dual function: it clears counter 26 through OR gate 42 and sets flip-flop 45 to a high state. Flip-flop 45 is in a low state up to this point because it has its "reset" input fed continuously by the output 37 from comparator 36, which resets flip-flop 45 low after the shutter is changed back to a slower speed following the last laser firing. The output from flip-flop 45 is fed to AND chip 54. Chip 54 also receives the register clock control signal 24 as noted above. The connection through switch 40 connects the output from the multivibrator at 24 to the AND chip 54. The output from chip 54 is fed to the register input RCK on the counter 26. Thus, there is no output to the register from AND 54 until the timing is correct in the circuit for synchronized firing. This allows the counter to output a zero binary count because it has been reset to zero by the external voltage source. The result is a system that allows arbitrary yet synchronized triggering of the light source because the invention introduces the proper delay between the triggering voltage and the actual application of a voltage to the light source for triggering. This action also incorporates the pre-selected shutter control requirements for background light suppression.

We claim:

1. An electronic interface circuit for the synchronization of a pulsed light source with the video signal generated by a video camera with an integral electronic shutter, including:

means for employing said synchronization signal from said video signal; and, means for employing said synchronization signal to generate a delayable trigger signal for activating said pulsed light source to time the imaging of the light from said pulsed light source to appear during the image integration time of said integral electronic shutter.

2. The electronic interface circuit of claim 1, wherein said interface circuit includes further means to employ said synchronization signal for electronic shutter control.

3. The electronic interface circuit of claim 1, wherein said video (camera) signal is the video frame pulse.

4. The electronic interface circuit of claim 1, wherein said interface circuit includes counter and comparator logical components.

5. An electronic interface circuit for the synchronization of a pulsed light source with the video signal generated by a video camera with an integral electronic shutter, including:

means for deriving a synchronization signal from said video signal; and, means for employing said synchronization signal for control of said integral electronic shutter to time imaging of the light from said pulsed light source to appear during the image integration time of said integral electronic shutter.

6. The electronic interface circuit of claim 5, wherein said interface circuit includes further means to employ said synchronization signal to derive a trigger signal for activating a pulsed light source.

7. The electronic interface circuit of claim 5, where in said video signal is the video vertical reference signal.

8. The electronic interface circuit of claim 5, wherein said synchronization signal is the video frame pulse.

9. The electronic interface circuit of claim 5, wherein said interface circuit includes counter and comparator logical components.

10. A method for synchronizing a pulse light source with a video camera field generated by a video camera with an integral electronic shutter, including:

deriving a synchronization signal from a video signal generated by said video camera; and, employing said synchronization signal to generate a delayable trigger signal for activating a pulsed light source to time the imaging of the light from said pulsed light source to appear during the image integration time of said electronic shutter.

11. The synchronizing method of claim 10, wherein said video signal is a video vertical reference signal.

12. The synchronization method of claim 10, wherein said synchronization signal is the video frame pulse.

13. A method for the synchronization of a pulsed light source with a predetermined video field generated by a video camera with a integral electronic shutter, including:

deriving a synchronization signal from a video signal generated by said video camera; and, employing said synchronization signal to control said electronic shutter speed and to time the imaging of the light from said pulsed light source to appear during the image integration time of said integral electronic shutter.

14. The synchronization method of claim 13, wherein said light source is a laser.

15. The synchronization method of claim 13, wherein said video signal is a video vertical reference signal.

16. The synchronization method of claim 13, wherein said synchronization signal is the video frame pulse.

17. An electronic interface circuit for synchronization of a pulsed light source with a video signal generated by a video camera with an integral electronic shutter, including:

means for deriving a synchronization signal from said video signal;

means for incorporating and applying a signal from a source external to both said camera and said interface: and, means for employing both said synchronization signal and said external signal to derive a trigger signal for activating said pulsed light source to time imaging of the light from said pulsed light source to appear during the image integration time of said integral electronic shutter.

18. An electronic interface circuit for the synchronization of a pulsed light source with a video signal generated by a video camera with an integral electronic shutter, including:

means for deriving a synchronization signal from said video signal;

means for incorporating and applying a signal from a source external to both said camera and said interface; and, means for employing both said synchronization signal and said external signal for control of said integral electronic shutter to time the imaging of the light from said pulsed light source to appear during the image integration time of said integral electronic shutter.

19. An electronic interface circuit for the synchronized control of the speed of an electronic shutter, integral with a video camera, on a frame-by-frame basis with a pulsed light source, including:

means for deriving a synchronization signal from a video signal generated by said video camera;

means for employing said synchronizaton signal to derive a trigger signal for activating said pulsed light source to time the imaging of the light from said pulsed light source to appear during the image integration time of said integral electronic shutter; and, means for employing said synchronization signal to control said electronic shutter speed.

* * * * *